United States Patent [19]

Robbins

[11] 4,374,489
[45] Feb. 22, 1983

[54] ADAPTABLE FOOD SMOKER ATTACHMENT

[75] Inventor: Jack Robbins, Mount Ida, Ark.

[73] Assignee: Ole-Arkie Corp., Hot Springs, Ark.

[21] Appl. No.: 273,491

[22] Filed: Jun. 15, 1981

[51] Int. Cl.³ .............................................. A23B 4/04
[52] U.S. Cl. .................................. 99/482; 126/41 R; 219/267
[58] Field of Search ................. 99/467, 471, 482, 352; 126/59.5, 41 R; 219/260, 267, 270, 261

[56] References Cited

U.S. PATENT DOCUMENTS

| | | | |
|---|---|---|---|
| 2,611,311 | 9/1952 | Irwin | 99/482 |
| 2,722,882 | 11/1955 | Wilson | 99/482 |
| 2,789,877 | 4/1957 | Pfundt | 99/482 |
| 2,966,941 | 1/1961 | Breese | 219/260 |
| 3,788,301 | 1/1974 | Terry | 99/482 |

*Primary Examiner*—Robert W. Jenkins
*Attorney, Agent, or Firm*—George F. Helfrich

[57] ABSTRACT

An adaptable device attachable, adjustable and removable to and from the underside of natural or LP gas, electrical and certain conventional cooking grills and ovens, stationary or portable, such as are commonly employed to grill or cook food. The device includes a removable coupling unit which is mounted to a draft opening, normally a part of the underside of a grill or cooking unit. The lower area of the removable coupling unit has a smoking column, which is a tube, hollow column or barrel apparatus connectable thereto in a locking fashion and disconnectable therefrom in a reverse locking fashion, into which is placed a measurable volume of hardwood flakes or fine particles. Provided also is an electrical power heating source element to ignite or smolder the hardwood fine particles of flakes, the electric power heating source being sealed in the lower portion of the smoking column. The electric power heating source is connected to an electric power source through an electric power cord attachable to a battery or typical electric outlet. The flavoring smoke produced by the heating element is controlled smoke, which is drafted upward by standard or implemented draft openings in the underside of the grills or ovens other than the one of which the removably connected coupling unit is a part. The controlled smoke so generated flavors food on a plate in the grill or oven as needed.

3 Claims, 4 Drawing Figures

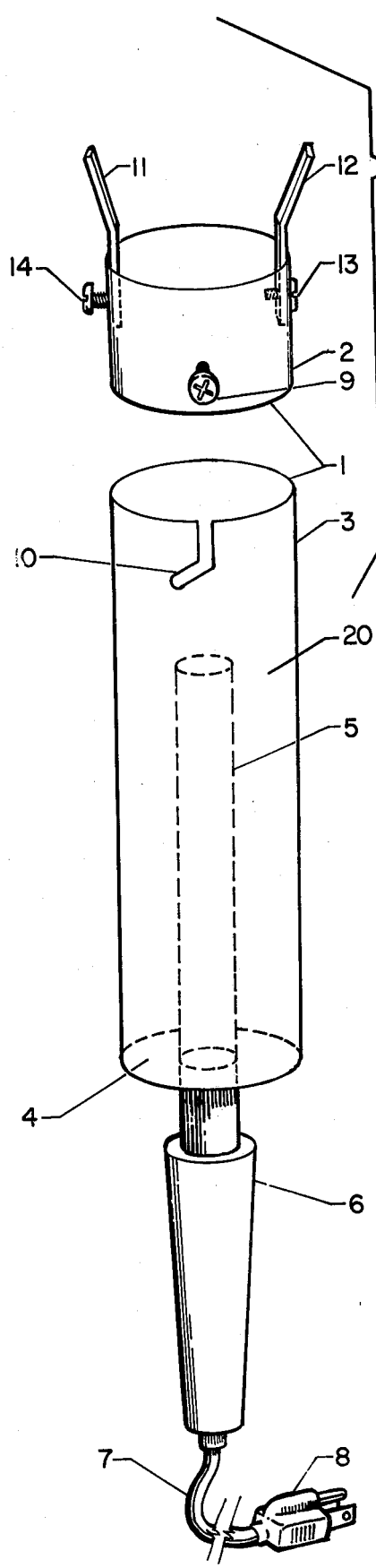
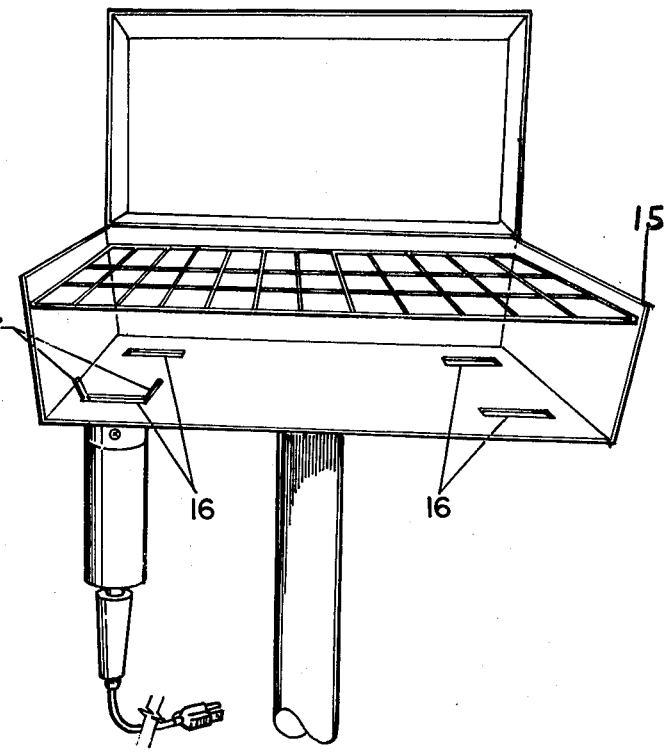
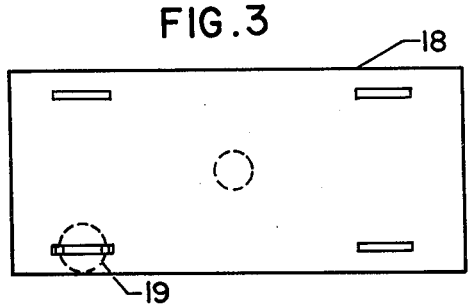

ADAPTABLE FOOD SMOKER ATTACHMENT

BACKGROUND OF THE INVENTION

1. Field of the Invention

The present invention relates generally to an apparatus for cooking or processing food. In particular it relates to an apparatus for imparting a smoke flavoring to food being cooked or processed.

2. Prior Art Background and Summary of the Invention

From circa 1950 consumers have acquired electric or gas meat and food cooking grills which are eminently suited for preparing grilled foods. These very popular cooking devices or grills, which are found fixed in domicile yards and patios mostly, but in portable form as well, have a latent design to accommodate an attachment such as the present invention. The unexpected uniqueness of the device of the present invention is substantiated in that those expert in the art have overlooked the importance and effectiveness of such a device. These historic Bar B Q and cooking grills so mentioned have lacked a convenient way in which to use smoke flavoring mediums such as fine-particle hardwood flakes or chips, of which hickory wood is the most pronounced, delectable, and the most popular. A great preponderance of grills already acquired by consumers have in the base pan thereof two or more openings for drafting air to aid in effecting more complete combustion. The uniqueness of the instant invention resides in part in its ability to be connected and disconnected conveniently and easily to such a draft opening. Another real function of the instant invention is a result of the design to use an electric heating element secured in the bottom part of a two-piece attachment, this bottom portion being referred to as the smoking column, wherein the electric heating element is sealed. The top portion of the two-piece attachment is referred to as the coupling unit. The smoking column is first filled to a desired level with a flavor imparting smoking medium such as hickory flakes, whereupon the heating element smolders-without undesirable flaming-the hickory or other hardwood particles or flakes, giving off a controllable and measurable quantity of flavor-imparting smoke. The uniqueness of the present invention is further exemplified by affording an interim connect and disconnect, should the smoking process need to be permanently or temporarily suspended during a cooking or smoking cycle. While it is the primary object of the present invention to serve grills which have draft slots available and integral, other grills or ovens may be readily adapted by fabricating a slot or slots therein of the size of the slots present in the preponderance of grills already acquired by consumers. While modification of grills and ovens without so-called slots might be done, the primary object of the present invention is to fill the flavor needs of foods in the already-mentioned fixed and portable gas and electric grills. The practice of manufacturing grills with openings is a continuing practice in the state of the art. Therefore the desirability of the present invention will be preserved for future grill users. Moreover, while the technique described herein is dedicated to consumer uses, the technique is not precluded for enhancement of commercial and industrial smoking techniques.

Prior Art Statement

In the present application it is distinctly important to point out that foods in addition to meat, such as corn on the cob, beans, potatoes, bread, and the like, can be enhanced in flavor by imparting flavor such as that from hickory smolder. Since the degree of smoking of different foods is sensitive due to shape, character and density, the desired control of the degree of smoke flavoring of the present invention and its inherent adaptability separates the instant invention from the standard meat smoking ovens and devices somewhat historic in the state of the art, the closest of which are considered to be Tygart, U.S. Pat. Nos. 1,964,372; Reuland U.S. 2,842,043; Henderson, U.S. 2,894,448; Huckaby, U.S. 2,967,023; Huckaby, U.S. 3,088,292; Horton, U.S. 3,517,602; Muse, U.S. 3,776,127; Macknow, West German No. 23 49 020; Tomita, U.S. Pat. Nos. 3,915,145; and Streets, U.S. 3,865,052; the last one of which is not an oven, but a charcoal starter device by title. Moreover, while the instant invention might be adapted to devices under the above-cited patents, as well as typical Bar B Q ovens or grills, it appears infeasible for the above-cited patented inventions to be attachments per se. The device according to the present invention obviously escaped the imagination of the inventors of the above-cited patents; and more importantly and significantly, there is no suggestion that the historic grills or ovens per se covered under the cited patents be adapted in toto to one another as attachments to themselves vis-a-vis.

It is therefore a principal object of the present invention to provide an adaptable food smoker attachment that permits anyone having a natural or LP gas, electric or certain conventional cooking grills and ovens, stationary or portable, to prepare smoked foods according to suitable tastes.

Another object of the present invention is to provide an adapatable food smoker attachment which utilizes measured small quantities of hardwood particles for smoking, thus differing from large smoking apparatuses, but not precluded from use with said large commercial and industrial ovens and devices.

Still another object of the present invention is to provide an adaptable food smoker attachment which is simple in design, inexpensive to manufacture, rugged in construction, easy to maintain, storable in a small place on a conventional shelf, safe, clean, easy to use, and efficient in operation.

These and other objects will be readily evident upon a study of the following specification and accompanying drawing.

BRIEF DESCRIPTION OF THE DRAWING

FIGS. 1-3 show a first device according to the present invention, first in exploded prespective, and next attached to a conventional cooking grill.

DETAILED DESCRIPTION OF THE PREFERRED EMBODIMENTS

Figure 4:
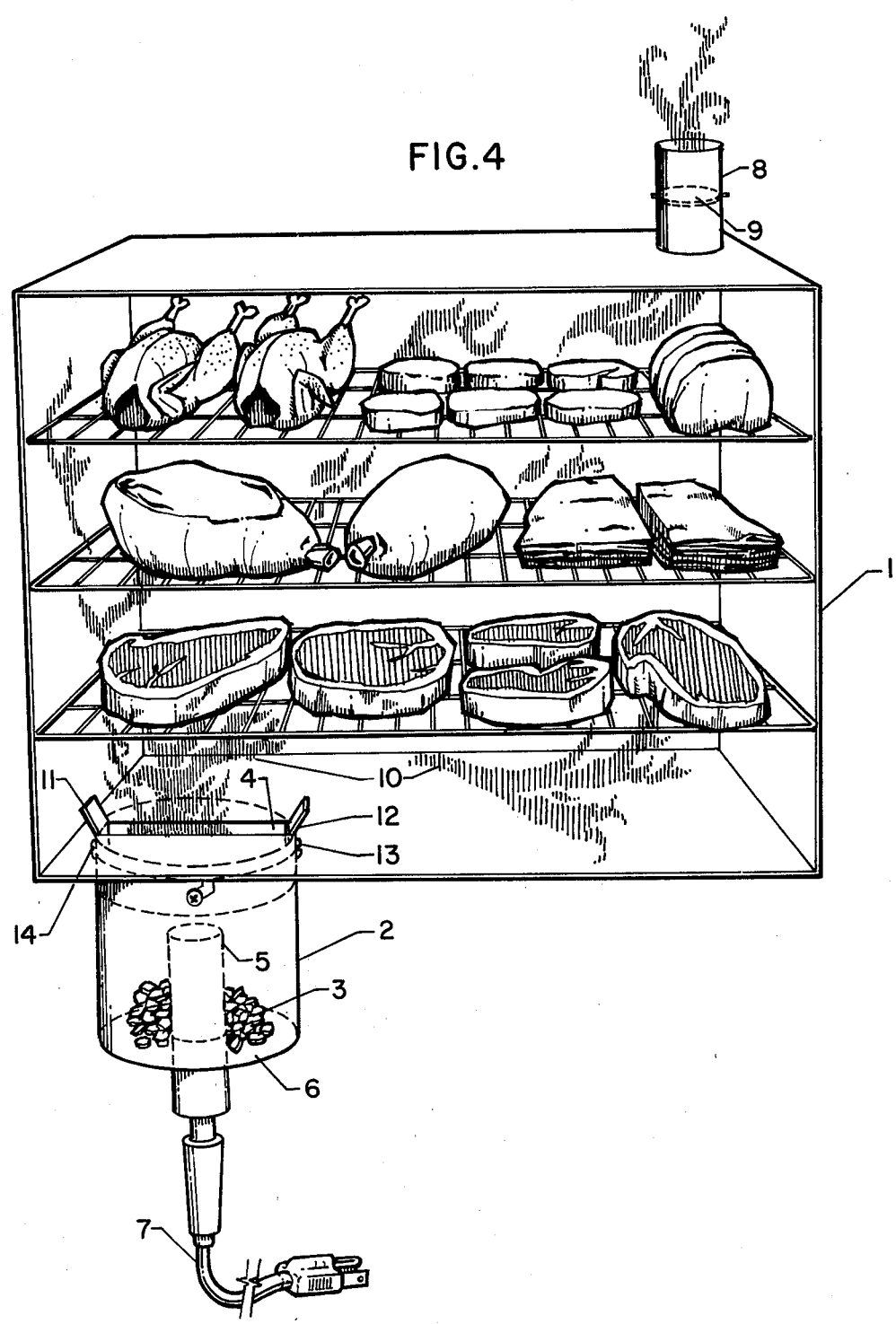
FIG. 4 shows a second device according to the present invention, which has been attached to a typical meat storage case.

Referring to FIGS. 1-3, an adaptable food smoker attachment is generally indicated by numeral 1. The attachment is made up of two basic parts, viz, a coupling unit 2 and a smoking column 3. The smoking column has securely sealed at 4 therein a heating element 5, to which is attached and made a part thereto a handle 6, an electric cord 7, and an electrical plug 8. The coupling unit 2 is made up of a set-lock screw 9, utilized when locking slot 10 in the smoking column 3 is brought to slide into set-lock screw 9 and then turned in a twisting fashion to secure and hold in place smoking column 3. Coupling unit 2 is also comprised of two earlike metal clips 11 and 12, said earlike parts held by set screws 13 and 14.

After being assembled, device 1 is ready to be used by attaching to the underside of a cooking grill 15 using any one of a number of standard vent openings 16. The coupling unit 2 is attached to vent openings by inserting the earlike metal clips 11 and 12 inside one of the vent openings 16, and then setting set screws 13 and 14 until coupling unit 2 is firmly and securely fastened. On the plan view 18, such attachment is seen at 19. The purpose of this attachment is consummated when a smoking medium such as hickory flakes is poured or placed inside smoking column 3 up to a point such as 20, and said filled smoking column is attached to the coupling device 2. The adaptable food smoker attachment 1 is then fastened to any one of vent holes 16 as previously described. Electric energy heats heating element 5, causing the smoking medium in smoking column 3 to smolder, thereby creating hickory or other smoke, which is eminently desirable in flavoring foods. Said food smoker attachment can be utilized when the cooking grill is operating or not operating. Smoking column 3 can be removed from coupling device 2 at any time during a heating or cooking cycle, in order to refill smoking column 3 with additional smoking medium such as hickory flakes. Smoking column 3 is removed by reversing the twisting movement used when attaching smoking column 3 to coupling unit 2.

Referring to FIG. 4, a typical meat storage case, refrigerated or unrefrigerated, or heated or unheated is generally indicated by numeral 1. An adaptable food smoker attachment 2 containing a smoking medium such as hickory flakes 3 is attached to meat case 1 by inserting food smoker attachment into an opening 4 in the bottom of meat case 1. Said hickory flakes 3 are caused to smoke or smolder by a heating element 5 attached and sealed at 6 in the bottom end of the adaptable food smoker attachment 2, and an electric cord with plug 7 is inserted into a typical electrical outlet or receptacle. A draft opening pipe 8 is placed in an opening on the top (or the side) of the meat case 1, and an adjustable damper 9, which is mounted in the draft opening pipe 8, controls the amount of smoke being generated inside the meat case 1 by food smoker attachment 2. Smoke so generated in a smoldering fashion as at 10 is eminently desirable in giving unique flavor to meat. The adaptable food smoker attachment is secured in opening 4 by securing earlike metal clips 11 and 12 by set screws 13 and 14. The operation of food smoker attachment 2 and the efficiency thereof is not dependent on any type of outside heating energy source operating said meat storage cabinet 1, but does not preclude the use thereof in order to use the adaptable food smoker attachment 2.

Following are more detailed instructions in the employment of a device according to the present invention as specified above.

1. Preheat the grill for 5 to 10 minutes before starting cooking cycle. This will burn away any insects or foreign material that could have entered the grill since its last use. While preheating the grill, plug in and attach the food smoker to the grill, but do not place any wood flakes in the attachment. After preheating the grill, turn it off and place the food or meat to be cooked on the grill and fill the food smoker with wood flakes. Fill the unit at least three fourths full. Allow smoke to filter up and around food for as long as desired—this could be 10 to 30 minutes. After smoking the food or meat, turn the grill back on and cook to the desired time.

2. While certain meats will take longer to smoke than others, this method is recommended for turkeys, hens, etc. as well as spare ribs and hams. With the food smoker attachment the grill can be used almost as a smokehouse for all sorts of foods. This will allow one to place any food to be smoked inside the grill and smoke it as long as desired to acquire the desired smoke flavor. This is done by simply filling and refilling the attachment as many times as necessary. Then turn on the grill and cook the food or meat.

3. For a longer smoking cycle, leave the grill hood propped open approximately 1" during the smoking cycle. Aslo, if a lot of smoke is desired, detach food smoker after 5 to 10 minutes and stir the wood flakes with a small rod or stick, then reattach smoker to grill. This can be done until wood flakes are consumed. Then refill and start cycle again.

Although the present invention has been described in detail with respect to certain preferred embodiments thereof, it is understood by those of skill in the art that variations and modifications in this detail may be effected without any departure from the spirit and scope of the present invention, as defined in the hereto-appended claims.

What is claimed is:

1. An adaptable food smoker attachment comprised of two parts, the first part being a coupling unit having at the upper end thereof means for removable connection to a draft opening located on the underside of a fixed or portable cooking grill, oven, or meat storage case; the second part being a smoking column, which is a tube, hollow column, or barrel having at the upper end thereof a means for removable connection to the lower end of the coupling unit in a locking fashion and disconnection therefrom in a reverse locking fashion, the smoking column having an electric power heating source sealed in the lower portion thereof, the upper end of the electric power heating source extending upwards into the smoking column and being spaced from the walls thereof so that a space in the smoking column is provided for containment of hardwood particles or flakes to be smoldered, the lower end of the electric power heating source terminating in means for connection to a source of electric current.

2. The device of claim 1, wherein the means for removable connection of the upper end of the smoking column to the lower end of the coupling unit in a locking fashion and disconnection therefrom in a reverse locking fashion is the cooperative combination of a set-lock screw positioned on the lower end of the coupling unit and a locking slot fabricated in the upper end of the smoking column.

3. The device of claim 2, wherein the means for removable connection of the upper end of the coupling unit to a draft opening of a grill, oven, or meat storage case is a duality of opposed, elongated metal rods, which are affixed at their lower ends to the coupling unit by means of set screws, and which are bent in a direction away from each other at their upper ends, the upper ends of the rods extending into the draft opening and effecting engagement therewith as a result of the bent segments of the rods.

* * * * *